(No Model.) 3 Sheets—Sheet 1.
E. PECKHAM.
CAR TRUCK.
No. 471,062. Patented Mar. 15, 1892.
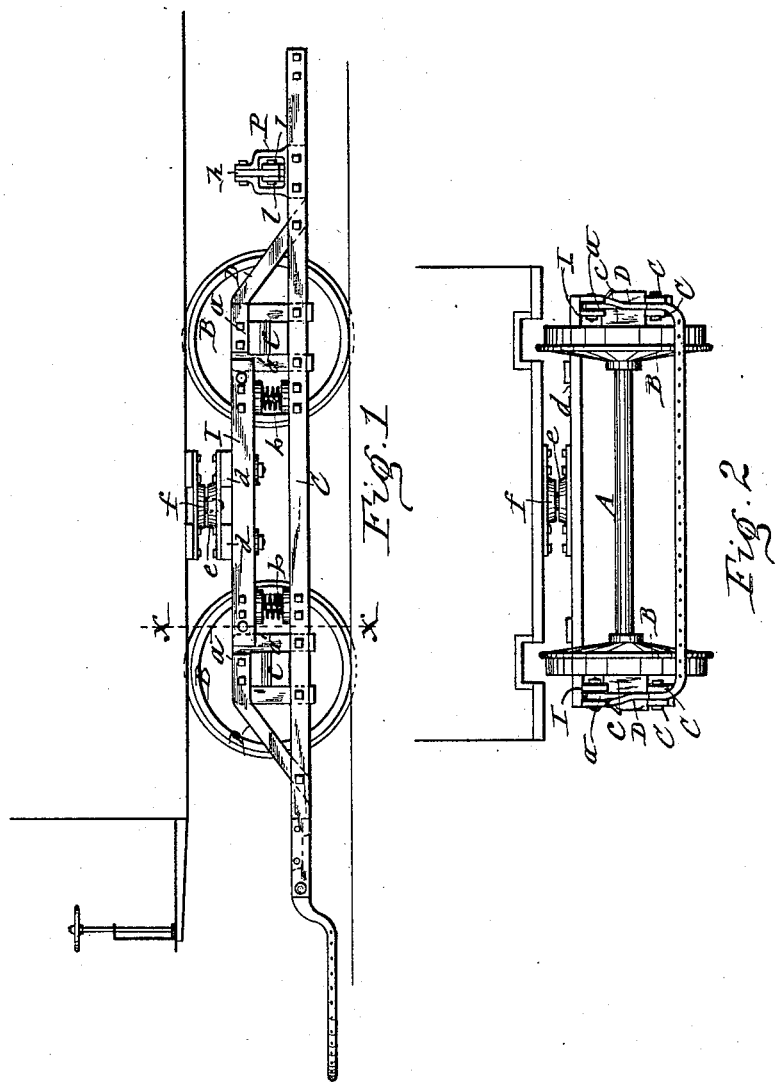

(No Model.) 3 Sheets—Sheet 2.

E. PECKHAM.
CAR TRUCK.

No. 471,062. Patented Mar. 15, 1892.

Witnesses
C. L. Bendixon
J. J. Laass

Inventor:
Edgar Peckham
By his Attorneys
Duell, Laass & Duell (No Model.) 3 Sheets—Sheet 3.

E. PECKHAM.
CAR TRUCK.

No. 471,062. Patented Mar. 15, 1892.

WITNESSES:
J. J. Laass
C. L. Bendixon

INVENTOR:
Edgar Peckham
By Duell, Laass & Duell
his ATTORNEYS.

UNITED STATES PATENT OFFICE.

EDGAR PECKHAM, OF KINGSTON, NEW YORK, ASSIGNOR, BY MESNE ASSIGNMENTS, TO THE PECKHAM MOTOR TRUCK AND WHEEL COMPANY, OF SAME PLACE.

CAR-TRUCK.

SPECIFICATION forming part of Letters Patent No. 471,062, dated March 15, 1892.

Application filed October 30, 1890. Serial No. 369,788. (No model.)

*To all whom it may concern:*

Be it known that I, EDGAR PECKHAM, of Kingston, in the county of Ulster, in the State of New York, have invented new and useful Improvements in Car-Trucks, of which the following, taken in connection with the accompanying drawings, is a full, clear, and exact description.

This invention relates to a car-truck designed, chiefly, for supporting one end of a long car-body, but also possessing certain features of novelty adapted to be embodied in a truck arranged under the center of the car-body.

The object of the invention is to simplify the construction of the truck and to provide means for supporting an electric motor on a truck having the front and rear wheels near each other.

To that end the invention consists in the novel construction and combination of parts hereinafter fully described, and specifically set forth in the claims.

Figure 3:
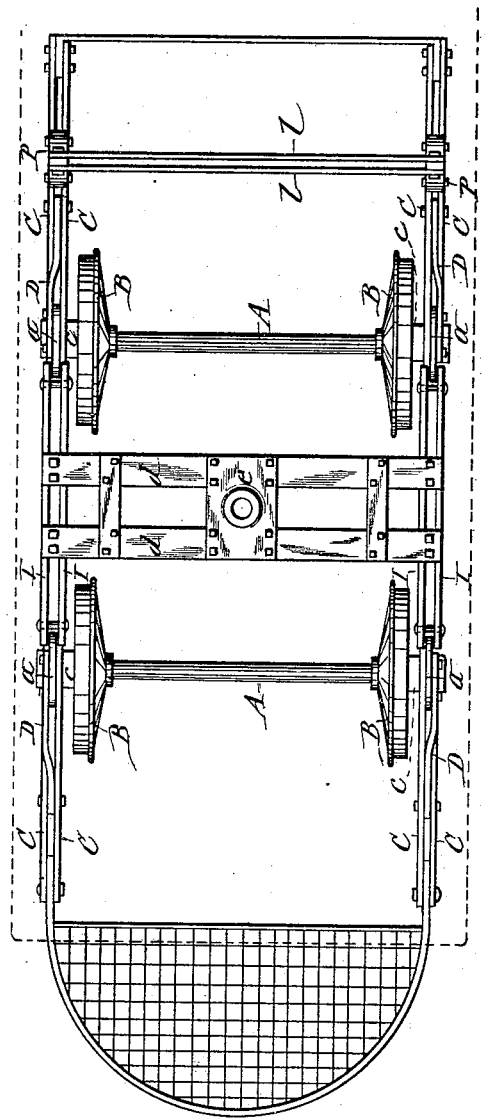
Figure 4:
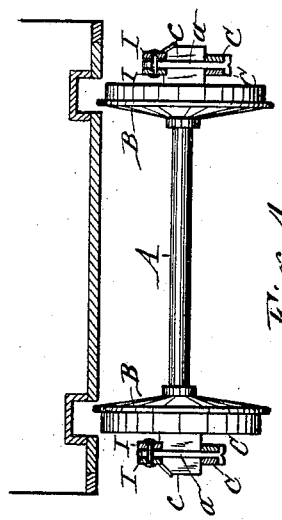
Figure 5:
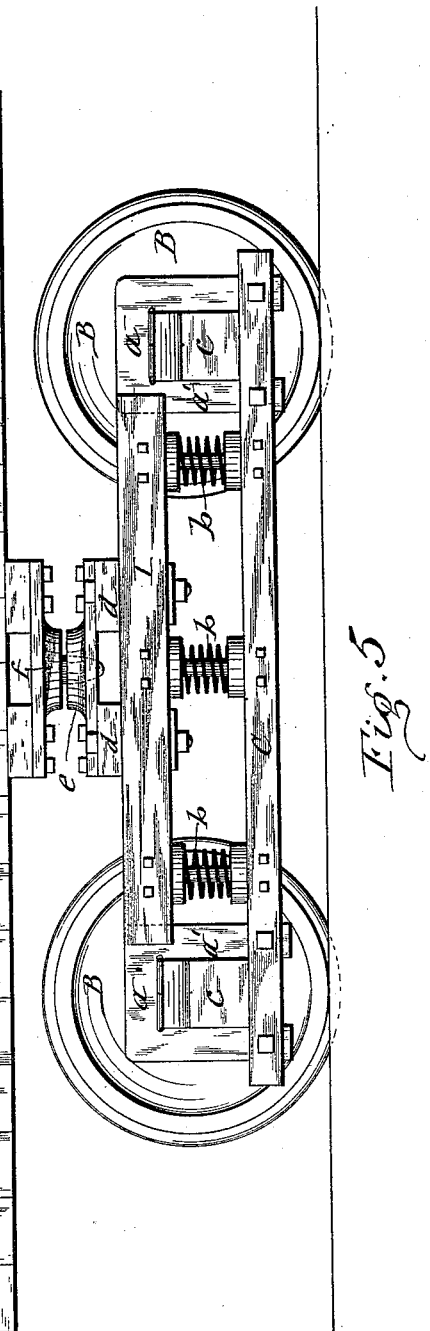

In the annexed drawings, Figure 1 is a side elevation of a truck embodying my improvements. Fig. 2 is an end view of the same. Fig. 3 is a top plan view of the truck. Fig. 4 is vertical transverse section on line $x$ $x$, Fig. 1; and Fig. 5 is an enlarged side view of a modification of my improved car-truck.

Similar letters of reference indicate corresponding parts.

A A denote the car-axles, having affixed to them the wheels B B, and $c$ $c$ represent the journal-boxes containing the bearings for the journals of the aforesaid axles. Upon the said journal-boxes are hung the yokes $a$ $a$, which have vertical limbs embracing the sides of the journal-boxes and extending below the same. To the lower ends of said yokes are firmly secured the rigid longitudinal side bars C C, which extend from yoke to yoke and across the under sides thereof and may either extend beyond said yokes and to the ends of the car, as shown in Fig. 1 of the drawings, or terminate near said yokes after crossing the same, as represented in Fig. 5 of the drawings, which latter construction is adapted for ordinary railroad-cars, while the truck shown in Fig. 1 is more particularly designed for electric street-cars. It will, however, be observed that in either case the truck-frame extends across the journal-boxes of both axles and is supported thereon. The prolonged end portions of the said side bars receive additional support from braces D D, which are attached to the top portions of the yokes and are inclined toward the end portions of the side bars and firmly secured thereto. Between the yokes $a$ $a$ on each side of the truck are springs $b$ $b$, mounted on the side bars C C, and upon said springs are supported supplemental longitudinal bars I I, disposed parallel side by side, with a space between them, and secured to each other by bolts or rivets or otherwise; or, if desired, a single supplemental bar with vertically-bifurcated ends may be employed in lieu of the two bars I I. These spring-supported bars are sustained movably vertically by means of suitable vertical guides rigidly attached to and projecting upward from the longitudinal bars C C, on which guides the aforesaid bars I I slide vertically. To simplify the construction, I utilize the inner vertical limbs $a'$ $a'$ of the yokes $a$ $a$ for the aforesaid guides. The ends of the bars I I loosely embrace said limbs, so as to allow said bars to slide vertically thereon.

To the tops of the bars I I, at opposite sides of the truck, I rigidly secure cross-bars $d$ $d$, and thus form an elastically-supported platform, on the central portion of which or upon the cross-bars $d$ $d$ I fasten the pivot-plate or step $e$ for the reception of the pivot $f$, secured to the under side of the car-body.

Inasmuch as four-wheeled trucks of this class have the front and rear wheels only a short distance apart, it is difficult or impossible to place an electric motor between the axles A A. I therefore form the truck-frame with ends extending beyond the wheels and connect the motor-support to the inner end of said frame and counterbalance the motor by the life-guard extending from the outer end of the frame.

In the construction of the truck illustrated in the annexed drawings the extensions thereof consist of the end portions of the side bars C C, to which the motor-support is secured. This motor-support I preferably form of pedestals P P, mounted on and bolted or riveted to the end portions of the bars C C and having pivoted to their upper ends hangers *h h*, to the lower ends of which are pivotally connected the cross-bars *l l*, and to the central portions of the latter is connected the heel of the motor in any suitable and well-known manner not necessary to be here illustrated.

Having described my invention, what I claim as new, and desire to secure by Letters Patent, is—

1. A car-truck frame consisting of rigid longitudinal bars extending across the journal-boxes of both axles and supported thereon, vertical guides rigidly attached to said bars and extending upward therefrom, supplemental longitudinal bars sliding on said guides, and springs interposed between the aforesaid rigid bars and supplemental bars, as set forth.

2. In combination with the journal-boxes, yokes riding on said boxes and having vertical limbs, longitudinal side bars secured to the lower portions of the said yokes, longitudinal bars sliding vertically on the aforesaid limbs of the yokes, springs supporting the latter bars on the aforesaid side bars, and the car-body supported on the spring-supported bars, as set forth and shown.

3. In combination with the journal-boxes, car-body, and pivot secured to the under side of said body, yokes hung on the journal-boxes and having vertical limbs, longitudinal side bars rigidly attached to the lower portions of said yokes, longitudinal bars guided vertically on the limbs of the yokes, springs supporting the latter bars on the aforesaid side bars, cross-bars attached to the spring-supported bars, and a pivot-plate secured to said cross-bars and receiving the pivot of the body, substantially as described and shown.

4. In a car-truck, the combination, with the journal-boxes, of the yokes *a a*, having vertical limbs embracing the sides of said boxes and extending below the same, the side bars C C, secured to the lower ends of the yokes and extending beyond the same, braces D D, attached to the top portions of the yokes and inclined to the end portions of the aforesaid side bars and attached thereto, springs *b b*, mounted on the side bars between the yokes, and longitudinal bars I I, supported on said springs and having their ends loosely embracing the inner limbs of the yokes, substantially as described and shown.

5. An electric car having its body supported by two separate and distinct trucks, respectively, under the two end portions of the body, a motor mounted on the inner end of one of said trucks, and a life-guard extending from the outer end of the same truck and counterbalancing the motor, as set forth and shown.

6. In a car-truck, the combination, with the journal-boxes, of the yokes *a a*, having vertical limbs embracing the sides of said journal-boxes and extending below the same, the side bars C C, attached to the lower ends of the yokes and extending beyond the same, braces D D, attached to the top portions of the yokes and extending to and attached to the end portions of the side bars, and a motor-support carried on said end portions of the side bars, substantially as described and shown.

In testimony whereof I have hereunto signed my name this 10th day of October, 1890.

EDGAR PECKHAM. [L. S.]

Witnesses:
 WILLIAM SUTPHEN,
 J. H. BURTON.